UNITED STATES PATENT OFFICE.

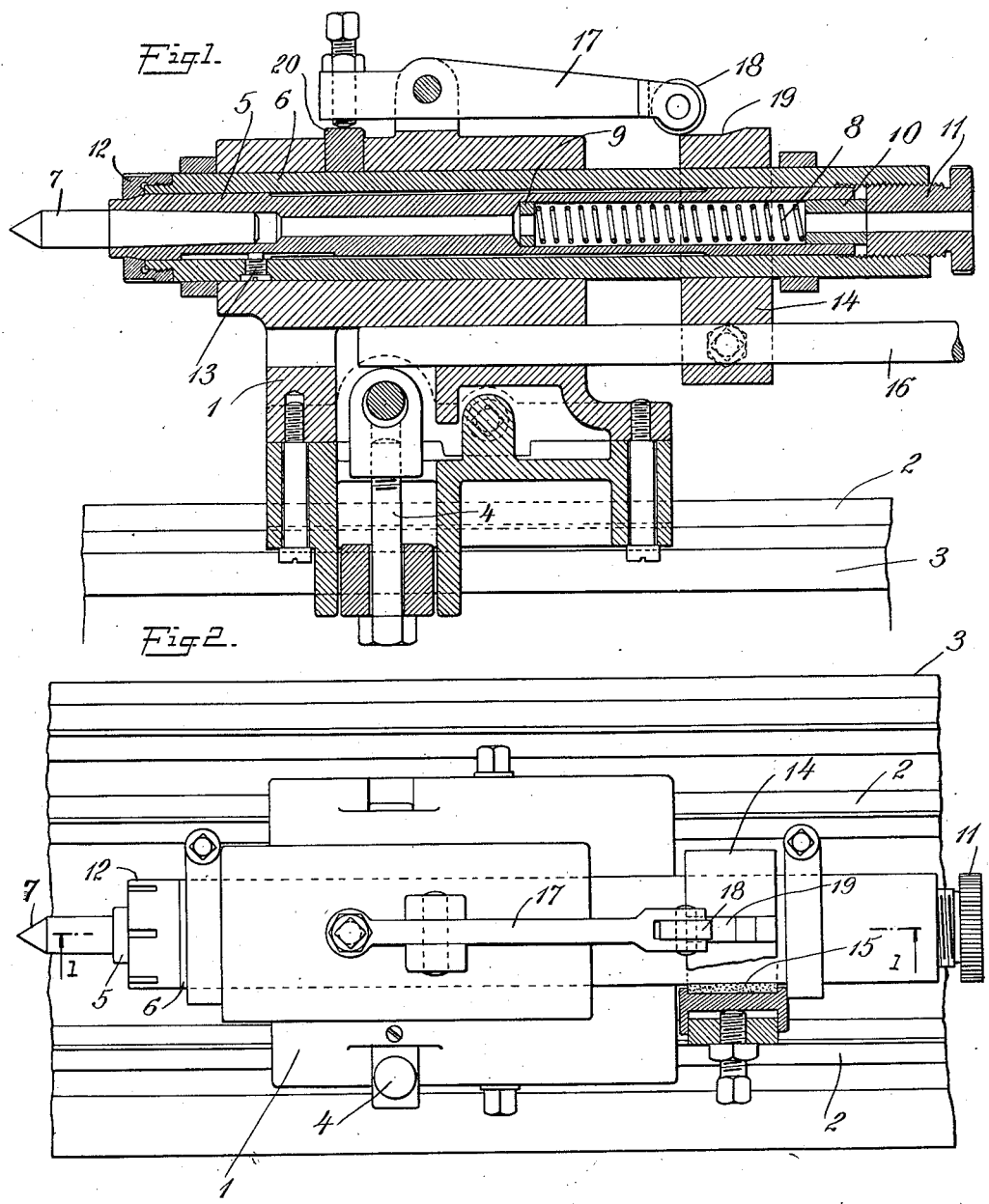

FRIEDERICH MÜLLER, OF HARTFORD, CONNECTICUT, ASSIGNOR TO PRATT & WHITNEY COMPANY, OF NEW YORK, N. Y., A CORPORATION OF NEW JERSEY.

LATHE TAIL-STOCK.

1,318,223.   Specification of Letters Patent.   Patented Oct. 7, 1919.

Application filed March 6, 1918. Serial No. 220,746.

*To all whom it may concern:*

Be it known that I, FRIEDERICH MÜLLER, a citizen of the United States, residing at Hartford, in the county of Hartford and State of Connecticut, have invented certain new and useful Improvements in Lathe Tail-Stocks, of which the following is a specification.

The present invention is particularly applicable to tailstocks of the type set forth in my Patent No. 869,588 dated October 29th, 1907. Such a tailstock is especially well adapted to be used in connection with or as a part of an automatic lathe of the type set forth in my Patent No. 1,252,928 dated January 8th, 1918.

The work being turned becomes more or less heated as the result of the cutting action, and when the work is long and slender the resulting expansion tends to cause the work to spring or buckle. This interferes with the normal cutting operation and causes the finished article to be non-cylindrical.

The principal object of the present invention is to provide an improved tailstock which will yield in accordance with the expansion of the work. A further object of the invention is to provide improved means whereby the tailstock may be so adjusted as to be capable of yielding when narrow slender work is being turned or to be incapable of yielding when larger heavier work is being turned.

In the accompanying drawing I have shown the invention applied to a tailstock similar in principle to that shown in my Patent 869,588. It will be understood, however, that the invention can be otherwise embodied and that the drawing is merely illustrative and is not intended to define or limit the scope of the invention, the accompanying claims being relied upon for that purpose.

Of the drawing:

Figure 1 is a vertical sectional view taken along the line 1—1 of Fig. 2.

Fig. 2 is a plan view, certain parts being broken away and others being shown in section.

Referring to the drawing, 1 represents the main frame or body of a tailstock, this being adjustably mounted in the usual way on the guideways 2, 2 of a lathe bed 3. The body part of the tailstock can be clamped to the bed by any usual or preferred means such as indicated as a whole by 4. Extending longitudinally through the body of the tailstock is a cylindrical aperture in which is slidably mounted a sleeve 5. Preferably, for reasons which will presently appear, the aperture is formed in a support or spindle 6 which itself is longitudinally movable in an aperture in the main frame of the tailstock.

The aperture of the sleeve 5 is tapered at one end to receive a center 7 in the usual manner. At the other end the aperture of the sleeve 5 is enlarged to receive a coil spring 8 which serves to move the sleeve toward the left. At its inner or left-hand end the spring 8 abuts against a washer 9 positioned within the sleeve, and at its outer or right-hand end the spring abuts against a member or bushing 11 which is adjustable within the sleeve, preferably being screw threaded. Preferably a bushing 10 is interposed between the spring and the bushing 11. For limiting the movement of the sleeve 5 toward the left there is provided a stop in the form of a cap 12 surrounding the sleeve and engaging a beveled surface thereof, this cap having threaded engagement with the spindle 6.

With the parts in the positions shown, the sleeve 5 is held in its left-hand position in engagement with the cap 12, but it is free to yield toward the right against the action of the spring 8 when pressure is applied to the center 7. The spring pressure can be adjusted by turning the bushing 11. The adjustment shown, with the sleeve 5 held by the spring, is that which is ordinarily desirable for turning light slender work. For heavier work, when no yielding of the tailstock center is desired, the bushing 11 is turned and moved into firm engagement with the right-hand end of the sleeve 5, thus forcing the sleeve into firm engagement with the cap 12. This locks the sleeve and holds it rigidly against any movement with respect to the spindle 6.

Preferably, for preventing the sleeve 5 from turning in the spindle 6, there is provided a screw 13 in the spindle 6 which projects into a keyway in the sleeve 5.

It will be observed that there is an opening entirely through the outer part of the sleeve 5 thus making it possible to insert a rod for driving out the center 7 when necessary.

When the tailstock is to be used as a part of an automatic lathe, means is provided for automatically moving the spindle 6 to bring the center 7 into and out of engagement with the work. As illustrated, a collar 14 is slidably mounted on the spindle 6, having adjustable frictional engagement therewith by means of a suitable friction shoe, as shown at 15. The collar 14 is connected with a longitudinal rod 16 which is adapted to be moved by the lathe mechanism at the proper times. When the rod 16 is moved toward the left it carries the collar 14 with it and the collar 14 moves the spindle 6 with the center until the center engages the work. Thereafter the collar 14 slides on the spindle. The frictional resistance at 15 should be less than the resistance offered by the spring 8, so that the spindle 6 will not be moved relatively to the sleeve 5.

A lever 17 is pivotally mounted on the main frame of the tailstock and at its right-hand end carries a roller 18 adapted to engage a cam surface 19 formed on the collar 14. The lever 17, at its right-hand end, is adapted to engage a shoe 20 which is in contact with the spindle 6. The continued movement of the collar 14 toward the left forces the cam surface 19 under the roller 18, thus swinging the lever 17 in the counter-clockwise direction and pressing the shoe 20 into firm engagement with the spindle 6. In this way the spindle is firmly held against any return movement and the center 7 is firmly held in engagement with the work and is permitted to move, if at all, only against the resistance of the spring 8. When the rod 16 moves the collar 14 in the other direction toward the right, the lever 17 is released, thus releasing the pressure on the spindle 6. Further movement of the collar 14 causes the spindle 6 to be moved toward the right, thus withdrawing the center from engagement with the work.

What I claim is:

1. A lathe tailstock comprising in combination, a frame, a spindle longitudinally movably mounted in the frame, a center-carrying sleeve longitudinally movably mounted in the spindle, a spring for holding the sleeve in its normal position with respect to the spindle but adapted to permit the sleeve to move relatively under the influence of the pressure of the work on the center, and means for moving both the spindle and the sleeve to press the center against the work.

2. A lathe tailstock comprising in combination, a frame, a spindle longitudinally movably mounted in the frame, a center-carrying sleeve longitudinally movably mounted in the spindle, a spring for holding the sleeve in its normal position with respect to the spindle but adapted to permit the sleeve to move relatively under the influence of the pressure of the work on the center, and means for applying to the spindle a predetermined pressure less than the spring pressure to move both the spindle and the sleeve and thus press the center against the work.

3. A lathe tailstock comprising in combination, a frame, a spindle longitudinally movably mounted in the frame, a center-carrying sleeve longitudinally movably mounted in the spindle, a spring for holding the sleeve in its normal position with respect to the spindle but adapted to permit the sleeve to move relatively under the influence of the pressure of the work on the center, and frictional means for applying to the spindle a predetermined pressure less than the spring pressure to move both the spindle and the sleeve and thus press the center against the work.

4. A lathe tailstock comprising in combination, a frame, a spindle longitudinally movably mounted in the frame, a center-carrying sleeve longitudinally movably mounted in the spindle, a spring for holding the sleeve in its normal position with respect to the spindle but adapted to permit the sleeve to move relatively under the influence of the pressure of the work on the center, means for applying to the spindle a predetermined pressure less than the spring pressure to move both the spindle and the sleeve and thus press the center against the work, and an automatic lock for clamping the spindle to the frame.

5. A lathe tailstock comprising in combination, a frame, a spindle longitudinally movably mounted in the frame, a center-carrying sleeve longitudinally movably mounted in the spindle, a spring for holding the sleeve in its normal position with respect to the spindle but adapted to permit the sleeve to move relatively under the influence of the pressure of the work on the center, means for moving both the spindle and the sleeve to press the center against the work, and means adapted at the option of the operator to engage the sleeve and prevent its movement with respect to the spindle against the spring pressure.

6. A lathe tailstock comprising in combination, a support, a center-carrying sleeve longitudinally movably mounted in the support, a stop carried by the support, a spring for holding the sleeve in its normal position with one end in engagement with the stop but adapted to permit the sleeve to move away from the stop under the influence of the pressure of the work on the center, and means adapted at the option of the operator to engage the other end of the sleeve and prevent its movement against the spring pressure.

7. A lathe tailstock comprising in combination, a support, a center-carrying sleeve longitudinally movably mounted in the support, a stop carried by the support, a spring for holding the sleeve in its normal position with one end in engagement with the stop but adapted to permit the sleeve to move away from the stop under the influence of the pressure of the work on the center, and means associated with the spring for adjusting the pressure thereof, the said means being also adapted to engage the sleeve to lock it against movement.

8. A lathe tailstock comprising in combination, a support, a center-carrying sleeve longitudinally movably mounted in the support, a stop carried by the support, a coil spring in a central aperture of the sleeve for holding the sleeve in its normal position with one end in engagement with the stop but adapted to permit the sleeve to move away from the stop under the influence of the pressure of the work on the center, and an adjustable abutment for the outer end of the spring, the said abutment being adapted to engage the sleeve to lock it against movement.

9. A lathe tailstock comprising in combination, a support, a center-carrying sleeve longitudinally movably mounted in the support, a stop carried by the support, a coil spring in a central aperture of the sleeve for holding the sleeve in its normal position with one end in engagement with the stop but adapted to permit the sleeve to move away from the stop under the influence of the pressure of the work on the center, and an adjustable threaded member serving as an abutment for the outer end of the spring, the said member being adapted to engage the sleeve to lock it against movement.

10. A lathe tailstock comprising in combination, a frame, a center-carrying sleeve longitudinally movably mounted in the frame, a coil spring in a central aperture of the sleeve for holding the sleeve in its normal position but adapted to permit the sleeve to move under the influence of the pressure of the work on the center, and an adjustable threaded bushing serving as an abutment for the outer end of the spring and adapted to engage the sleeve to lock it against movement, there being a continuous opening through the bushing the spring and the sleeve permitting a rod to be inserted for driving out the center.

In testimony whereof, I hereto affix my signature.

FRIEDERICH MÜLLER.